United States Patent [19]

Simkin

[11] 4,001,034

[45] Jan. 4, 1977

[54] HIGH TEMPERATURE COATINGS BASED ON POLY (ZINC PHOSPHINATES)

[75] Inventor: Joseph Simkin, Lafayette Hill, Pa.

[73] Assignee: The United States of America as represented by the Secretary of the Air Force, Washington, D.C.

[22] Filed: Oct. 31, 1975

[21] Appl. No.: 627,808

[52] U.S. Cl. .................... 106/292; 106/300
[51] Int. Cl.² .................................. C09C 1/36
[58] Field of Search ............. 106/292, 300, 308 Q

[56] References Cited

UNITED STATES PATENTS

| | | |
|---|---|---|
| 3,505,088 | 4/1970 | Weber et al. ............... 106/300 |
| 3,556,828 | 1/1971 | Durrant et al. ............. 106/300 |
| 3,560,234 | 2/1971 | Holbein ..................... 106/300 |
| 3,756,841 | 9/1973 | Beliveau .................... 106/300 |

Primary Examiner—Winston A. Douglas
Assistant Examiner—J. V. Howard
Attorney, Agent, or Firm—Joseph E. Rusz; William J. O'Brien

[57] ABSTRACT

A high temperature coating composition composed of a solvent mixture of zinc chloride, titanium dioxide, and an organo-substituted phosphinic acid.

1 Claim, No Drawings

HIGH TEMPERATURE COATINGS BASED ON POLY (ZINC PHOSPHINATES)

STATEMENT OF GOVERNMENT INTEREST

The invention described herein may be manufactured and used by and for the Government for governmental purposes without the payment of any royalty thereon.

BACKGROUND OF THE INVENTION

This invention relates to thermally resistant coating materials. In a more particular aspect, this invention concerns itself with high temperature coating materials based on poly (zinc phosphinates) and to a method for preparing such coatings.

The recent advent of supersonic vehicles has created a need for coating materials resistant to the high skin temperatures that are generated within the operational environment of such vehicles. Conventional protective coatings, based upon drying oils and resins such as linseed oil and alkyds, are useful only at moderately elevated temperatures. Progress has been made on extending the thermal tolerance of coatings by the development of systems utilizing organic polymers based upon condensed units with highly conjugated double bonds. Additional improvements have been made with organosilicone-based coatings. However, current temperature requirements are even higher, and coatings resistant to thermal and oxidative degradation up to 1000° F in air are needed.

An attempt to provide a solution to the need for high temperature coatings indicated that coating compositions based on poly(zinc phosphinates) possess the high thermal stability required for use with supersonic vehicles. Poly(metal phosphinates) are a family of polymers based on an inorganic backbone formed by metal atoms connected by —OPO— bridges. Because the metal centers in the poly(metal phosphinates) are surrounded by oxygen atoms, the polymer backbone is particularly resistant to oxidative degradation, and, as a rule, the polymers are very stable thermally. Among the polymer compositions found to be most stable and useful as a coating material are the metal phosphinates in which zinc is the central atom. They possess an inherent thermal stability that makes them especially useful for high temperature applications in many areas of technology.

At the present time, however, few of these materials are capable of facile conversion into coatings by standard preparative methods such as from a melt or by deposition from a solvent. $Zn[OP(Me)(Ph)O]_2$ is one of the few zinc phosphinates that are appreciably soluble in organic solvents and melt at a reasonable temperature, but the coatings obtainable to date have been unsatisfactory because of pinhole formation. Moreover, this composition is less thermally stable than others of the same type. The zinc phosphinates which show the greatest thermal stability are practically insoluble or poorly soluble in common solvents and do not melt at a reasonable point below their decomposition temperatures. $Zn[OPh_2O]_2$ is insoluble in common solvents and as a result cannot be utilized as a binder for high temperature coatings. $Zn[OP(C_6H_4SO_2Ph)(Ph)O]_2$ is practically insoluble in common solvents and required a proportionally large amount of strong coordinating solvents such as dimethyl formanide for disolution. Preparations attempted from a solution of $Zn[OP(C_6H_4SO_2Ph)PhO]_2$ in 15 parts DMF and 35 parts $C_6H_6$ result in coatings with poor integrity and pinholes.

An attempt to overcome these problems led to the discovery that the preparation of coatings utilizing zinc phosphinates that were heretofore impossible to use because of poor solubility or intractability can be accomplished by an in-situ preparation with ingredients soluble in common solvents. Such formulations are surprisingly stable in solution and do not show any supersaturation or tendency to precipitate even though the reaction products would be expected to be insoluble.

SUMMARY OF THE INVENTION

In accordance with this invention, it has been found that coating materials based on poly(zinc phosphinates) can be used effectively as high temperature coatings on supersonic vehicles. Previous attempts at using these materials as coatings were not fruitful because of a lack of suitable solvents for the phosphinates. This problem was circumvented, however, by the present invention which involves an in-situ reaction between starting materials soluble in a non-aqueous solvent system.

For example, $Zn[OPPh_2O]_2$ is insoluble in a mixture of MeOH and benzene, but a mixture of $ZnCl_2$ and $Ph_2P(O)OH$ was found to be soluble in such a solvent system. When this solution is sprayed onto a surface, the resultant residue, after evaporation of solvent, is essentially $Zn[OPPh_2O]_2$, and none of the byproduct is present after curing.

In still another example, a blend consisting of $TiO_2$ and containing $ZnCl_2$, $Ph(PhSO_2C_6H_4)P(O)OH$, and $Me(Ph)P(O)OH$ was dispersed in a solvent mixture. A formulation containing 20 percent solids gave coatings with satisfactory hardness, integrity, and appearance. The coating thickness was approximately 1–1.5 mil, and the weight of the coating per panel averaged 0.35 g. The coating properties were independent of the cure temperatures, which ranged from ambient to 150° C. Analysis of scrapings from the coating indicates that no chloride is present in the "cured" product. During exposure to 1000° F (538° C) in air for 2 hours the coating apparently undergoes a partial oxidation. It first turns dark and then gradually becomes white again. The resulting coating is ceramic-like in appearance, possesses excellent hardness, and shows no visible mudcracking or loss of coating integrity.

Accordingly, the primary object of this invention is to develop a technique for utilizing thermally stable poly(-zinc phosphinates) as high temperature coatings.

Another object of this invention is to provide a method for fabricating coating materials that can be cured at low temperatures and possess thermal stability up to 1000° F.

The above and still other objects and advantages of the present invention will become more readily apparent upon consideration of the following detailed description thereof.

DESCRIPTION OF THE PREFERRED EMBODIMENTS

Poly(zinc phosphinates) possess a relatively high degree of thermal stability by virtue of inorganic backbones in which metal atoms are connected by "—OPO—" bridges. $Zn(OPPh_2O)_2$, for example, first decomposes at 475° C when heated in air in a thermal balance. Thermogravimetric data on this and other phosphinates are given in Table 1.

Table 1.

| Composition | Atmosphere | TGA Temperature °C wt. loss | | | |
|---|---|---|---|---|---|
| | | Initial | 5% | 10% | 20% |
| $Zn(OPP_2O)_2$ | air | 475 | 510 | 520 | 330 |
| $Zn[OP(Me)(Ph)O]_2$ | air | 380 | 440 | 460 | 470 |
| $Zn[OP(C_6H_4SO_2Ph)(Ph)O]_2$ | air | 450 | 499 | 500 | 520 |

However, at the present state of the art, few of these materials are capable of facile conversion into coatings by standard preparative methods such as from a melt or by deposition from a solvent. $Zn[OP(Me)(Ph)O]_2$ is one of the few zinc phosphinates that are appreciably soluble in organic solvents and melt at a reasonable temperature, but the coatings obtainable to date have been unsatisfactory because of pinhole formation. Moreover, this composition is less thermally stable than others of the same type (Table 1). The zinc phosphinates which show the greatest thermal stability are insoluble or poorly soluble in common solvents and do not melt at a reasonable point below their decomposition temperature. $Zn[OPPh_2O]_2$ is insoluble in common solvents and as a result, cannot be utilized as a binder for high temperature coatings. $Zn[OP(C_6H_4SO_2Ph)(Ph)O]_2$, for example, is practically insoluble in common solvents and requires a proportionally large amount of strong coordinating solvents such as dimethyl formide for dissolution. Preparations attempted from a solution of $Zn[OP(C_6H_4SO_2Ph)PhO]_2$ in 15 parts DMF and 35 parts $C_6H_6$ result in coatings with poor integrity and pinholes.

This invention, however, provides a novel procedure for the preparation of coatings utilizing zinc phosphinates which were heretofore impossible to use because of poor solubility. The use of zinc phosphinates has been made possible by an in-situ preparation with ingredients soluble in common solvents. Such formulations are surprisingly stable in solution and do not show any supersaturation or tendency to precipitate even though the reaction products would be expected to be insoluble. For example, $Zn[OPPh_2O]_2$ is insoluble in a mixture of MeOH and benzene, but a mixture of $ZnCl_2$ and $Ph_2P(O)OH$ was found to be soluble in such a solvent system. When this solution is sprayed onto a surface, the resultant residue, after evaporation of solvent, is essentially $Zn[OPPh_2O]_2$, and none of the by-product is present after curing. The chemical reaction is shown by equation (1) as follows:

$$ZnCl_2 + 2 Ph_2P(O)H \rightarrow Zn[OPPh_2O]_2 + 2HCl \qquad 1.$$

For the purpose of further illustrating the invention, the following example is presented. The example details the preparation of a coating on titanium alloy that is essentially $Zn[OP(C_6H_4SO_2P_6H_5)(Ph)O]_2$ and that is of satisfactory physical appearance.

EXAMPLE 1

| | | |
|---|---|---|
| $ZnCl_2$ (95% assay) | 0.71 | grams |
| $Ph(PhSO_2C_6H_4)P(O)OH$ | 3.58 | grams |
| $Me(Ph)P(O)OH$ | 0.78 | grams |
| $TiO_2$ (DuPont R900) | 7.00 | grams |
| DMF | 5 | grams |
| MeOH | 15 | grams |

-continued

| | | |
|---|---|---|
| Benzene | 30 | grams |

In this example, the $ZnCl_2$ (95% assay), $(PhSO_2C_6H_4)(Ph)—P(O)OH$, and $Me(Ph)P(O)OH$ were dispersed in a solvent mixture of dimethyl formamide, MeOH, and benzene. Warming the dispersion on a hot plate (35° to 40° C) for several minutes gave a clear pale yellow solution. The titanium dioxide pigment was then added to the solution together with an appropriate amount of ceramic grinding stones. The dispersion was then ground by rolling on a rolling mill for 6 hours, decanted from the grinding stones, and sprayed onto a titanium alloy sheet. The coating which resulted after evaporation at room temperature set to touch in an hour. An additional 15 hours at ambient temperature gave a coating which is hard and shows good integrity and adhesion. Hardness may be enhanced even further by curing at 150° to 200° C for 2 hours.

An obvious advantage of the procedure of this invention is that any zinc phosphinate type coating can be tailored by selection of the appropriate substituted phosphinic acid as is represented by the following general equation:

$$ZnCl_2 + 2R(R')P(O)OH \rightarrow Zn[OP(R)(R')O]_2 + 2HCl$$

where R and R' are alkyl or aryl substituents.

Because the titanium alloy Ti-6Al-4v is accepted in the industry and is known for its poor coating adhesion, it was selected as the standard metal to be used in evaluating the coating materials of this invention. The formulation of the above example was used to spray eleven 3 in. by 2 in. panels and eight 2 in. by 1 in. panels of the titanium alloy. The amount of dry coating found (2 hours at 150° C) averaged 0.16 g per panel or 2.8 g/ft². The panels were first cleaned in accordance with conventional techniques.

All panels were dried at room temperature for 16 hours and then heated at 150° C for 2 hours to remove trace solvents.

Duplicate panels for each formulation were placed in a furnace held at 350° C (662° F). The panels were removed after 23 hours and permitted to cool at ambient room temperature for one hour. Observations and physical measurements were made on the heated panels after they reached room temperature (usually within 35 to 45 minutes after removal from furnace). This cycle was repeated three more times, and the panels were then heated for 71 hours to terminate the run at a total heating time of 163 hours.

A separate run was made under identical conditions except that the furnace temperature was maintained at 540° C The panels were examined after each heating cycle for the following properties: color, weight, coating integrity (microscope), and adhesion (tape test without scoring of coating). Results of the tests are given in Tables II and III. The data indicate that these coatings show excellent thermal-shock resistance and reasonably good adhesion and retain sufficient integrity so that protection is maintained even after 163 hours heating at 540° C (1000° F).

TABLE II

Cyclic Thermal Tests at 350° C - Physical Properties of Coatings from the Example

|  |  | Start | 23 hours | 46 hours | 69 hours | 92 hours | 163 hours |
|---|---|---|---|---|---|---|---|
| Color | A | light gray | slight yellowing | off-white, gray cast | gray | gray | gray |
|  | B | " | " | " | " | " | " |
| Weight | A | 17.151 | 17.144 | 17.140 | — | — | 17.118 |
| grams | B | 16.656 | 16.648 | 16.635 | 16.624 | 16.620 | 16.618 |
| Tape | A | pass | — | good, 10% removal | — | — | pass |
|  | B | pass | — | — | pass | — | pass |
| Integrity | A | good, not smooth | good, not smooth | good, smooth | good, smooth | good, smooth | good, smooth |

TABLE III

Cyclic Thermal Tests at 540° C (1000° F) - Physical Properties of Coatings from the Example

|  |  | Start | 23 hours | 46 hours | 69 hours | 92 hours | 163 hours |
|---|---|---|---|---|---|---|---|
| Color | A | light gray | white | white | white | white | white |
|  | B | " | " | " | " | " | " |
| Weight | A | 16.064 | 16.030 | 16.030 | 16.031 | 16.031 | 16.034 |
| grams | B | 15.932 | 15.897 | 15.898 | 15.899 | 15.900 | 15.900 |
| Tape | A | pass | — | pass | pass | — | pass |
|  | B | " | — | — | " | — | " |
| Micro integrity | A | good, not smooth | good, not smooth | good, not smooth | good, not smooth | good | good |
|  | B | " | " | " | " | " | " |

Although the principle of this invention has been described with particularity, it should be understood that various alterations and modifications can be made without departing from the spirit of the invention which is defined by the appended claims.

What is claimed is:

1. A coating composition composed of a solvent mixture of about 1.0 percent by weight $ZnCl_2$; about 5.7 percent by weight $Ph(PhSO_2C_6H_4)P(O)OH$; about 1.2 percent by weight $Me(Ph)P(O)OH$; about 11.2 percent by weight $TiO_2$; and the balance substantially all solvent.

* * * * *